United States Patent Office 3,467,624
Patented Sept. 16, 1969

3,467,624
EPOXIDE POLYMERS AND PROCESS FOR PREPARING SAME
Akira Onishi, Takao Ishikawa, Ryozo Sakata, and Ryota Fujio, Kodaira, Tokyo, and Teiji Tsuruta, Fushimi-ku, Kyoto, Japan, assignors to Bridgestone Tire Company Limited, Chuo-ku, Tokyo, Japan, a corporation of Japan
No Drawing. Filed May 25, 1964, Ser. No. 370,119
Claims priority, application Japan, June 3, 1963, 38/28,192; July 30, 1963, 38/40,095
Int. Cl. C08g 23/14
U.S. Cl. 260—63                                11 Claims

ABSTRACT OF THE DISCLOSURE

A process for the production of epoxide polymers which comprises polymerizing olefin oxides in the presence of a catalyst system comprising an organo-zinc and an alpha, beta-unsaturated ketone, wherein the polymer product contains units of the said ketone.

---

This invention relates to epoxide polymers and a process of the preparation thereof by polymerization of epoxides characterized in that epoxides are polymerized in the presence of $\alpha,\beta$-unsaturated ketones by using dialkylzinc as catalyst.

It is of importance industrially to obtain high molecular weight polymer of epoxides efficiently, and the various methods for this object have been developed. For example, strontium carbonate was used for the preparation of high molecular weight polymer of ethylene oxide, and ferric chloride or diethylzinc-water system was used for the preparation of high molecular weight polymer of propylene oxide. Recently, K. T. Garty and his cooperaters have reported that phenyl glycidyl ether was polymerized by dibutylzinc-acetone catalyst system (Journal of Polymer Science, part A, volume 1, pages 85–102).

The present invention provides the entirely new and effective process for this object. Moreover, polymers prepared according to the invention have, new properties which have not heretofore been disclosed.

The present invention, which comprises a method for polymerization of epoxides in the presence of $\alpha,\beta$-unsaturated ketones by using dialkylzinc as catalyst, has the following characteristics; firstly, the polymerizations are accomplished very rapidly; secondly, the resulting polymers have high molecular weights; thirdly, the polymers contain $\alpha,\beta$-unsaturated ketone units used; fourthly, the reaction systems are homogeneous and the polymers are not strongly colored.

A high rate of polymerization is attained, when the reaction is carried out in the presence of $\alpha,\beta$-unsaturated ketones. Both of the unsaturated group and the carbonyl group in said ketones are indispensable and they should be adjacent to each other.

When the effects of three representative ketones which are methyl vinyl ketone, phenyl vinyl ketone and benzalacetone are compared with those of the corresponding saturated ketones which are methyl ethyl ketone, propiophenone and methyl $\beta$-phenylethyl ketone respectively, the effects of the former ketones are found much superior to those of the latter ones as is illustrated in the examples. This fact evidences the importance of the unsaturated group.

It is considered that the reaction of dialkylzinc with acetone takes place at the hydrogen atom of methyl group of acetone and that the reaction effects the catalytic action of the acetone-dialkylzinc system. Surprisingly, it has been found that the compound such as phenyl vinyl ketone which has no such active hydrogen shows an excellent effect. This fact also provides an evidence for the novelty of the invention.

The $\alpha,\beta$-unsaturated ketones, $\beta$-carbon of which is combined to either one of aryl, alkaryl and furyl group, e.g. benzalacetone and furfurylidene acetone, shows unexpectedly high activity for the polymerization. This fact is shown when, for instance, the effect of benzalacetone is compared with that of methyl vinyl ketone. This provides further evidence of the novelty of the invention.

Carbonyl group in the unsaturated ketones is indispensable, because no reaction takes place in the presence of isoprene in place of methyl vinyl ketone. Compounds which have both the carbonyl group and unsaturated group but these groups are separated as in the case of vinyl acetate have no effect.

$\alpha,\beta$-unsaturated esters such as acrylates and methacrylates are not effective.

The polymers obtained according to the invention have sufficiently high molecular weight to be used as industrial products, such as elastic or plastic materials. Especially, the polymerization of propylene oxide in the presence of either of methyl vinyl ketone and furfurylidene acetone is characterized by producing the extremely high molecular weight polymers.

The polymers prepared according to the invention contain $\alpha,\beta$-unsaturated ketone units used in the polymerization as a part of polymers.

Ketones which are easily incorporated in polymers are $\alpha,\beta$-unsaturated ketones having no substituent at $\beta$-carbon atoms, preferably vinyl ketones such as methyl vinyl ketone and phenyl vinyl ketone. The incorporation of ketone units into the polymers of epoxides as a part of them is an entirely new fact which has not heretofore been disclosed and provides a new means for the modification of the polymers of epoxides.

A great number of the reaction systems of the polymerization of epoxides which have been published are heterogeneous and strongly colored. The reaction systems according to the invention are homogeneous and colored only slightly. This fact provides advantages in the process of the polymerization and in the qualities of the products.

Epoxides used in this invention include (a) epoxides of aliphatic and alicyclic hydrocarbons, preferably monoepoxides of 2 to 8 carbon compounds, (b) epoxy ethers having ethylenic unsaturation, and (c) epoxides having a furan group. Epoxides of group (a), sometimes considered and designated as olefin oxides, include ethylene oxide, propylene oxide, butene oxides, btuadiene oxides, cyclohexene oxide, vinylcyclohexene oxides, cyclooctadiene oxides and styrene oxide. An example of epoxyethers having ethylenic unsaturation is allyl glycidyl ether. An example of epoxides having a furan group is furfuryl glycidyl ether.

In accordance with the present invention these epoxides may be polymerized singly (homopolymerization) or as mixed monomers (copolymerization). Epoxides having neither ethylenic unsaturation nor furan group such as ethylene oxide, propylene oxide and butene oxides are copolymerized with epoxides having either ethylenic unsaturation or a furan group such as butadiene monoxide, vinylcyclohexene monoxide, cyclooctadiene monoxide, allyl glycidyl ether and furfuryl glycidyl ether to give copolymers having either ethylenic unsaturation and furan group in the macromolecule, which can be used to produce three dimensional polymers.

The term "the polymer" used herein means homopolymer of the above described epoxides and copolymers consisting of the above described mixed monomers and also the term "the polymerization" used herein means polymerization of the above described epoxide and copolymerization of the above described mixture monomers.

Dialkylzinc used in the invention has the following general formula:

R—Zn—R wherein R represents a lower alkyl.

The polymerization according to the invention involves a cleavage of the epoxide ring rather than an addition reaction, and also the resulting polymers are characterized by the presence of unsaturated ketone units. The configuration of these novel polymers may be represented as follows:

(a) (Propylene oxide monomer)

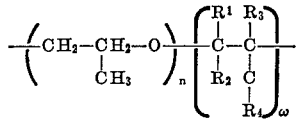

(b) (Allyl glycidyl ether monomer)

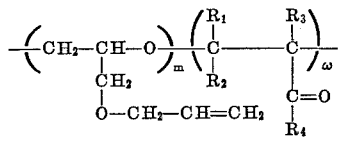

(c) (Propylene oxide-allyl glycidyl ether monomer mixture)

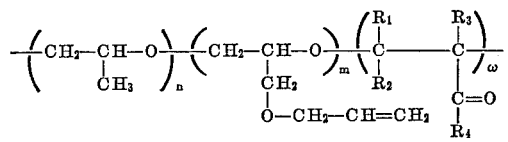

wherein $R_1$, $R_2$, $R_3$ and $R_4$ are as defined hereinafter, and $\omega$ is less than $n$ or $m$, as indicated by the several examples set out below.

The amount of dialkylzinc is generally from 0.01 to 10 mole percent based on the reacting monomers.

$\alpha,\beta$-Unsaturated ketones used in the invention are the compounds having the following general Formula K:

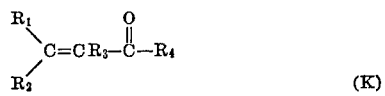

wherein $R_1$, $R_2$ and $R_3$ are selected from the class consisting of hydrogen, alkyl, cycloalkyl, aryl, aralkyl, alkaryl and furyl groups, and $R_4$ is selected from the class consisting of alkyl, cycloalkyl, aryl, aralkyl, alkaryl and furyl groups.

The preferred compounds are the compounds selected from the class consisting of the following four groups of ketones:

(1) Ketones having the following general Formula K'

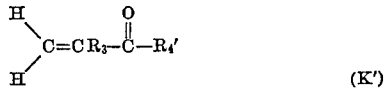

wherein $R_3$ is selected from the class consisting of hydrogen, alkyl, cycloalkyl, aryl, aralkyl, alkaryl and furyl groups and $R_4'$ is selected from the class consisting of alkyl, cycloalkyl and aralkyl groups;

(2) Ketones having the following general Formula K''

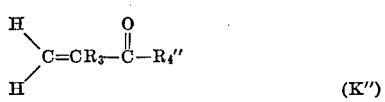

wherein $R_3$ is same as that already defined and $R_4''$ is selected from the class consisting of aryl, alkaryl and furyl groups;

(3) Ketones having the following general Formula K'''

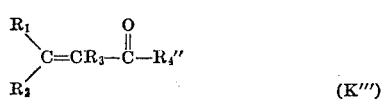

wherein $R_1$, $R_2$, $R_3$ and $R_4''$ are same as those already defined, wherein $R_1$ and $R_2$ should not be hydrogen at the same time.

(4) Ketones having the following general Formula K''''

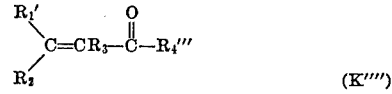

wherein $R_1'$ is selected from the class consisting of aryl, alkaryl and furyl groups, $R_2$ and $R_3$ are same as those already defined and $R_4'''$ is an alkyl group, preferably methyl group.

The first group of these ketones is characterized by the easiness of incorporation of ketone units into the marcomolecules produced. The second group of these ketones is characterized by the easiness of incorporation of ketone units into the marcromolecules produced, by the lack of active hydrogen atom adjacent to the carbonyl group and by the extraordinarily high effect on the rate of polymerization. The third group of these ketones is characterized by the lack of active hydrogen atom adjacent to the carbonyl group. The last group of these ketones is characterized by the extraordinarily high effect on the rate of polymerization.

Examples of the preferred ketones are methyl vinyl ketone (group 1), phenyl vinyl ketone (group 2), chalcone (group 3), benzalacetone (group 4) and furfurylidene acetone (group 4).

The most preferable ketones are phenyl vinyl ketone, benzalacetone and furfurylidene acetone. The amount of $\alpha,\beta$-unsaturated ketone is generally from 0.1 to 10 mole per one mole of the reacting dialkylzinc and preferably from 0.5 to 5 mole per one mole of dialkylzinc. The most preferable mole ratio of a ketone to dialkylzinc is:

for ketones of the first group, from 0.5 to 3.0;
for ketones of the second group, from 1.0 to 5.0;
for ketones of the third group, from 1.0 to 5.0;
for ketones of the fourth group, from 0.5 to 3.0.

The polymerization and copolymerization are effected most preferably with the following combination of reactants:

dialkylzinc-methyl vinyl ketone-ethylene oxide;
dialkylzinc-phenyl vinyl ketone-ethylene oxide;
dialkylzinc-benzalacetone-ethylene oxide;
dialkylzinc-furfurylidene acetone-ethylene oxide;
dialkylzinc-methyl vinyl ketone-propylene oxide;
dialkylzinc-phenyl vinyl ketone-propylene oxide;
dialkylzinc-benzalacetone-propylene oxide;
dialkylzinc-furfurylidene acetone-propylene oxide;
dialkylzinc-methyl vinyl ketone-propylene oxide and either one of butadiene monoxide, allyl glycidyl ether and furfuryl glycidyl ether;
dialkylzinc-phenyl vinyl ketone-propylene oxide and either one of butadiene monoxide, allyl glycidyl ether and furfuryl glycidyl ether;
dialkylzinc-benzalacetone-propylene oxide and either one of butadiene monoxide, allyl glycidyl ether and furfuryl glycidyl ether; and
dialkylzinc-furfurylidene acetone-propylene oxide and either one of butadiene monoxide, allyl glycidyl ether and furfuryl glycidyl ether.

The polymerization is carried out in either of bulk and in a suitable inert diluent medium. Hydrocarbons such as pentane, hexane, heptane, octane, benzene, toluene, Tetralin and decalin, and ethers such as diethylether, tetrahydrofuran and dioxane can be used as an inert solvent.

The polymerization is carried out under an inert atmosphere such as nitrogen and argon.

The polymerization is effected at a temperature of from about 0 to 200° C. and preferably at a temperature of from 30 to 150° C.

The following examples further illustrate the invention but are not limitative.

Examples 1–9

In a 30 ml. test tube, 2.92 g. (50 mmole) of propylene oxide and a definite amount of methyl vinyl ketone were introduced and air in the tube was purged with nitrogen. Solution of 0.15 ml. of diethylzinc (3 mole percent and based on propylene oxide) in 3.5 ml. of benzene was added thereto. The tube was sealed, heated at 50° C. 15 hours, and chilled at 0° C. for 3 days. The reaction product was added to a large amount of chloroform, the insoluble part was filtered off, and the filtrate was washed with dilute hydrochloric acid and water successively. Polymer was obtained by removing volatile components from the solution in vacuo. Results are shown in Table 1.

Infrared spectra of the polymers clearly showed the presence of the units derived from methyl vinyl ketone, the amount of which increased with increase of the mole ratio of methyl vinyl ketone to diethylzinc.

TABLE 1

| Example: | Methyl vinyl ketone, diethylzinc (mole ratio) | Conversion, percent [1] | Reduced viscosity (concentration g./dl.) [2] |
|---|---|---|---|
| 1 | 0.0 | 2.8 | |
| 2 | 0.3 | 19.8 | 1.06 (0.30) |
| 3 | 0.7 | 25.2 | 25.2 (0.16) |
| 4 | 1.0 | 39.6 | 15.9 (0.26) |
| 5 | 1.3 | 37.7 | 32.2 (0.22) |
| 6 | 1.7 | 36.6 | 19.4 (0.22) |
| 7 | 2.0 | 38.9 | 14.2 (0.22) |
| 8 | 2.5 | 12.6 | |
| 9 | 3.0 | 35.4 | 6.0 (0.23) |

[1] Based on the sum of propylene oxide and methyl vinyl ketone employed.
[2] Measured in chloroform at 25° C. at the concentration shown in parentheses.

Examples 10–15

Into a test tube filled with nitrogen, 7 ml. of toluene, 5.81 g. (100 mmole) of propylene oxide, a definite amount of phenyl vinyl ketone and 1.5 ml. of solution of diethylzinc in toluene (2 mole/lit.) were added successively. The mixture was heated at 50° C. for 4 days, then methanol was added thereto and the resulting mixture was dried in vacuo at 50° C. Results are shown in Table 2.

Infrared study of the polymers proved the presence of phenyl vinyl ketone unit, the amount of which increased with increase of the mole ratio of phenyl vinyl ketone to diethylzinc.

TABLE 2

| Example: | Methyl vinyl ketone, diethylzinc (mole ratio) | Conversion, percent [1] | Reduced viscosity (concentration g./dl.) [2] |
|---|---|---|---|
| 10 | 0.0 | 5 | |
| 11 | 0.7 | 88 | 3.33 (0.41) |
| 12 | 1.5 | 74 | 1.70 (0.41) |
| 13 | 2.2 | 100 | 1.83 (0.41) |
| 14 | 3.0 | 100 | 1.16 (0.42) |
| 15 | 4.0 | 100 | |

[1] Based on propylene oxide employed.
[2] Measured in benzene at 30° C. at the concentration shown in parentheses.

Examples 16–20

In these examples, polymerizations were carried out in a manner similar to the Examples 10–15, except that benzalacetone was used in place of phenyl vinyl ketone. Results of the polymerizations are shown in Table 3.

TABLE 3

| Example: | Benzalacetone diethylzinc (mole ratio) | Conversion, percent | Reduced viscosity (concentration g./dl.) |
|---|---|---|---|
| 16 | 0.7 | 26.0 | |
| 17 | 1.5 | 99.8 | 1.11 (0.26) |
| 18 | 2.2 | 90.1 | |
| 19 | 3.0 | 56.7 | |
| 20 | 4.0 | 35.4 | |

Examples 21–25

In these examples, polymerizations were carried out in a manner similar to the Examples 10–15, except that chalcone was used in place of phenyl vinyl ketone. Results of the polymerizations are shown in Table 4.

TABLE 4

| Example: | Chalcone diethylzinc (mole ratio) | Conversion, percent | Reduced viscosity (concentration g./dl.) |
|---|---|---|---|
| 21 | 0.7 | 15.4 | |
| 22 | 1.5 | 25.0 | |
| 23 | 2.2 | 46.3 | 0.50 (0.12) |
| 24 | 3.0 | 37.3 | |
| 25 | 4.0 | 32.0 | |

Examples 26–30

Into a 30 ml. test tube filled with nitrogen, 2.92 g. (50 mmole) of propylene oxide, a definite amount of furfurylidene acetone, 5.0 ml. of toluene and 1.5 ml. of solution (1 mole/lit.) of diethylzinc in toluene (1 mole/lit.) were added successively. The mixture was heated at 50° C. for 7 days, thereafter dissolved in a large amount of benzene containing methanol, and then the precipitates formed were filtered off. The solution was washed with dilute hydrochloric acid and water successively, and freeze-dried twice. Results are shown in Table 5.

TABLE 5

| Example: | Furfurylidene acetone diethylzinc (mole ratio) | Conversion, percent | Reduced viscosity (concentration g./dl.) |
|---|---|---|---|
| 26 | 0.7 | 98.7 | 13.9 (0.50) |
| 27 | 1.5 | 100 | 3.2 (0.44) |
| 28 | 2.2 | 87.0 | |
| 29 | 3.0 | 83.2 | |
| 30 | 4.0 | 37.6 | |

Examples 31–36

Into a bottle filled with nitrogen, 17 ml. of toluene, 13.2 g. (300 mmole) of ethylene oxide, a definite amount of methyl vinyl ketone and 1.5 ml. of solution of diethylzinc in toluene (2 mole/lit.) were added successively. The mixture was heated at 50° C. for 2 days, and after treatment with methanol was dried in vacuo. Results are shown in Table 6.

Infrared study of the polymers proved the presence of methyl vinyl ketone unit, the amount of which increased with increase of mole ratio of methyl vinyl ketone to diethylzinc.

TABLE 6

| Example: | Methyl vinyl ketone diethylzinc (mole ratio) | Conversion, percent | Reduced viscosity [1] (concentration g./dl.) |
|---|---|---|---|
| 31 | 0.0 | 2 | |
| 32 | 0.7 | 100 | |
| 33 | 1.5 | 88 | 2.24 (0.37) |
| 34 | 2.2 | 36 | |
| 35 | 3.0 | 37 | |
| 36 | 4.0 | 16 | |

[1] Measured in benzene at 30° C.

Example 37

Into a test tube filled with nitrogen, 4.0 ml. of butadiene monoxide, 2.4 ml. of toluene, 0.17 ml. of methyl vinyl ketone and 1.55 ml. of solution of diethylzinc in toluene (mole/lit.) were added successively. The mixture was heated at 90° C. for 5 hours, and after treatment with methanol was dried in vacuo. Solid polymer thus obtained was 0.65 g. and it had a reduced viscosity of 0.32 (concentration of 0.068 g./dl; measured in benzene at 25° C.).

Example 38

Into a bottle filled with nitrogen, 41 ml. of toluene, 30 ml. of allyl glycidyl ether, 2.17 ml. of methyl vinyl ketone and 10.3 ml. of solution of diethylzinc in toluene (2 mole/lit.) were added successively. The mixture was heated at 50° C. for 70 hours, and after treatment with methanol was dried in vacuo. Solid polymer thus obtained was 6.7 g. and had an intrinsic viscosity of 1.5 at 30° C. in toluene.

Example 39

Into a test tube, 7.7 g. of furfuryl glycidyl ether and 0.17 ml. of methyl vinyl ketone were added, and air in the tube was purged with nitrogen, after which thereto 7 ml. of toluene and 1.5 ml. of toluene solution (1 mole/lit.) of diethylzinc were added. The tube was sealed and was heated at 50° C. for 10 days. The reaction product was dissolved in benzene containing a small amount of methanol, then after removal of the insoluble portion, the solution was washed with dilute hydrochloric acid and the solvent was distilled off. Yellow solid polymer thus obtained was 1.4 g. and had a reduced viscosity of 0.64 (concentration 0.08 g./dl). On exposure to air at room temperature for several days, this polymer was cross-linked to form a three-dimensional polymer which was insoluble in benzene. An attempt to polymerize furfuryl glycidyl ether in a similar manner without methyl vinyl ketone failed entirely.

Example 40

In this example, polymerization was effected at 50° C. for 4 days by employing 5.81 g. (100 mmole) of propylene oxide, 7 ml. of tetrahydrofuran, 1.5 ml. of solution of diethylzinc in toluene (2 mole/lit.) and 3.9 mmole of methyl vinyl ketone to obtain a polymer having a reduced viscosity of 6.13 (concentration 0.41 g./dl). The yield was 57%.

Example 41

In this example, polymerization was effected at 120° C. for 3 hours by employing 56.3 ml. of toluene, 0.43 ml. of methyl vinyl ketone, 3.5 ml. of solution of diethylzinc in toluene (1 mole/lit.) and 9.8 ml. of propylene oxide to obtain a polymer having a reduced viscosity of 2.91 (concentration 0.1 g./dl) with a yield of 84.2%.

Examples 42 and 43

Into a bottle filled with nitrogen, a definite amount of toluene, 0.65 ml. of methyl vinyl ketone, definite amounts of propylene oxide and ethylene oxide and 6.2 ml. of solution of diethylzinc in toluene (1 mole/lit.) were added successively. The mixture was heated at 50° C. for 75 hours, and after treatment with methanol dried in vacuo. Results are shown in Table 7.

TABLE 7

| Example: | Propylene oxide, ml. | Ethylene oxide, ml. | Toluene, ml. | Conversion, percent | Reduced viscosity (concentration g./dl.) |
|---|---|---|---|---|---|
| 42 | 12.6 | 1.0 | 7.4 | 66.7 | 2.27 (0.104) |
| 43 | 7.0 | 5.0 | 5.8 | 68.5 | 8.04 (0.090) |

Examples 44–46

Copolymerization was effected at 90° C. for 5 hours by employing a definite amount of toluene, 0.165 ml. of methyl vinyl ketone, definite amounts of propylene oxide and butadiene monoxide and 1.55 ml. of solution of diethylzinc in toluene (1 mole/lit.). Results are shown in Table 8.

TABLE 8

| Example: | Propylene oxide, ml. | Butadiene monoxide, ml. | Toluene, ml. | Conversion, percent, | Reduced viscosity (concentration g./dl.) |
|---|---|---|---|---|---|
| 44 | 6.3 | 0.80 | 7.1 | 95.6 | 16.7 (0.065) |
| 45 | 4.9 | 2.4 | 7.3 | 87.7 | 6.40 (0.087) |
| 46 | 3.5 | 4.0 | 7.5 | 71.1 | 3.25 (0.098) |

Example 47

Into a bottle filled with nitrogen, 41 ml. of toluene, 49 ml. of propylene oxide, 4.7 ml. of allyl glycidyl ether, 2.17 ml. of methyl vinyl ketone and 10.3 ml. of solution of diethylzinc in toluene (2 mole/lit.) were added successively. The mixture was heated at 50° C. for 30 hours, and after treatment with methanol containing a small amount of phenyl-$\beta$-naphthylamine as a stabilizer dried in vacuo at 50° C. The copolymer obtained (14.4 g.) was a light yellow, tough elastic material and was proved to comprise units derived from propylene oxide, allyl glycidyl ether and methyl vinyl ketone by infrared analysis. The copolymer had an intrinsic viscosity of 6.7 at 30° C. in toluene.

To 100 parts of this copolymer were compounded 30 parts of high abrasion furnace black, 3 parts of zinc oxide, 3 parts of sulfur, 1 part of phenyl-$\beta$-naphthylamine, 1.5 part of 2-mercaptobenzothiazole, and 0.5 part of tetramethylthiuramidisulfide. The compound was cured at 145° C. for 40 minutes, and gave a cross-linked elastomer having tensile strength of 103 kg./cm.$^2$.

Example 48

In this example, a copolymerization was carried out at 50° C. for 30 hours by employing 49 ml. of propylene oxide, 3.0 ml. of allyl glycidyl ether, 41 ml. of diethyl ether, 10.3 ml. of toluene solution (1 mole/lit.) of diethylzinc and 2.17 ml. of methyl vinyl ketone to obtain 13.2 g. of tough elastic material.

Examples 49–51

In these examples, copolymerization was carried out in a manner similar to Example 47 in presence of phenyl-$\beta$-naphthylamine and/or high abrasion furnace black to obtain tough elastomer in all cases. Results are shown in Table 9.

TABLE 9

| | High abrasion furnace black, g. | Pheny-$\beta$-naphthylamine, g. | Copolymer, g. |
|---|---|---|---|
| Example: | | | |
| 49 | 22.6 | 0 | 21.4 |
| 50 | 0 | 0.226 | 24.7 |
| 51 | 22.6 | 0.226 | 17.7 |

Example 52

In this example, copolymerization employing 2.2 g. of furfuryl glycidyl ether, 2.5 ml. of propylene oxide, 0.17 ml. of methyl vinyl ketone, 1.5 ml. of solution (1 mole/lit.) of diethylzinc in toluene and 5 ml. of toluene was carried out in a manner similar to Example 39. Yield of slightly yellow elastic polymer was 50%, and it had a reduced viscosity of 3.30 (concentration 0.15 g./dl). Infrared analysis of the polymer proved that the polymer contained furan ring. On exposure to air at room temperature for several days, this polymer was cross-linked to

Example 53

In this example, a copolymerization employing 1.7 g. of furfuryl glycidyl ether, 3.0 ml. of propylene oxide, 0.17 ml. of methyl vinyl ketone, 1.5 ml. of solution (1 mole/lit.) of diethylzinc in toluene and 5 ml. of toluene was carried out in a manner similar to Example 39. Yield of white elastic polymer was 49%, and it had a reduced viscosity of 3.24 (concentration of 0.15 g./dl). This polymer could also be cross-linked.

Example 54

Into a bottle filled with nitrogen, 41 ml. of toluene, 49 ml. of propylene oxide, 4.7 ml. of allyl glycidyl ether, 6.8 ml. of phenyl vinyl ketone and 10.3 ml. of solution (2 mole/lit.) of diethylzinc in toluene were added successively. The mixture was heated at 50° C. for 96 hours, and after treatment with methanol dried in vacuo at 50° C. Yield of tough elastic copolymer was about 100%.

Examples 55–73

In these examples, effects of three kinds of typical $\alpha,\beta$-unsaturated ketones were compared with those of corresponding saturated ketones. The results shown in Table 10 clearly show the importance of $\alpha,\beta$-unsaturated group. In these examples, 14 ml. of proylene oxide, 6.2 mole of diethylzinc and 14 ml. of toluene were employed and polymerizations were carried out at 50° C.

TABLE 10

| Example | Ketone | Ketone diethylzinc (mole ratio) | Polymerization time (hr.) | Conversion (percent) | Reduced viscosity (concentration g./dl.) |
|---|---|---|---|---|---|
| 55 | Methyl vinyl ketone | 1.3 | 50 | 40.2 | 9.7 (0.091) |
| 56 | Methyl ethyl ketone | 0.5 | 50 | 6.8 | |
| 57 | do | 1.0 | 50 | 8.1 | |
| 58 | do | 1.3 | 50 | 12.0 | 2.8 (0.087) |
| 59 | do | 1.5 | 50 | 11.1 | 3.1 (0.092) |
| 60 | do | 2.0 | 50 | 5.1 | |
| 61 | do | 3.0 | 50 | 2.9 | |
| 62 | Phenyl vinyl ketone | 2.2 | 96 | 100 | |
| 63 | Propiophenone | 0.5 | 96 | Small | |
| 64 | do | 1.0 | 96 | Small | |
| 65 | do | 1.5 | 96 | Small | |
| 66 | do | 2.0 | 96 | Small | |
| 67 | do | 3.0 | 96 | 5.9 | |
| 68 | Benzalacetone | 1.5 | 21 | 63.8 | 4.1 (0.092) |
| 69 | Methyl-$\beta$-phenylethyl ketone | 0.5 | 21 | 0 | |
| 70 | do | 1.0 | 21 | 6.4 | 0.8 (0.095) |
| 71 | do | 1.5 | 21 | 9.8 | 1.8 (0.085) |
| 72 | do | 2.0 | 21 | 11.7 | 1.1 (0.086) |
| 73 | do | 3.0 | 21 | 3.4 | 0.5 (0.060) |

We claim:

1. A process for the production of epoxide polymers, which comprises polymerizing a monomer system selected from the group consisting of (a) olefin oxides having 2–8 carbon atoms, and mixtures thereof, and (b) mixtures of a monomer selected from the group consisting of said olefin oxides and another monomer selected from the group consisting of glycidyl ethers having ethylenically unsaturated bond and glycidyl ethers having furan group by using dialkylzinc having the general formula R—Zn—R wherein R represents a lower alkyl as catalyst in the presence of $\alpha,\beta$-unsaturated ketone having the general formula

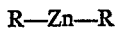
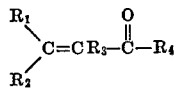

wherein $R_1$, $R_2$ and $R_3$ are groups selected from the class consisting of hydrogen, alkyl, cycloalkyl, aryl, aralkyl, alkaryl and furyl groups and $R_4$ is a group selected from the class consisting of alkyl, cycloalkyl, aryl, aralkyl, and furyl groups, the amount of said dialkylzinc being from 0.01 to 10 mole percent based on said monomer system, the mole ratio of said ketone to said dialkylzinc being from 0.1 to 10 mole per one mole, in the presence of inert solvent, at a temperature within the range from about 0° C. to 200° C. under an inert atmosphere to yield a solid polymer of high molecular weight which contains said $\alpha,\beta$-unsaturated ketone units.

2. A process for the production of epoxide polymers, which comprises polymerizing a monomer system selected from the group consisting of (a) olefin oxides having 2–8 carbon atoms, and mixtures thereof, and (b) mixtures of a monomer selected from the group consisting of said olefin oxides and another monomer selected from the group consisting of glycidyl ethers having ethylenically unsaturated bond and glycidyl ethers having furan group by using dialkylzinc having the general formula, R—Zn—R wherein R represents a lower alkyl as catalyst in the presence of $\alpha,\beta$-unsaturated ketone having the general formula

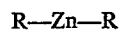
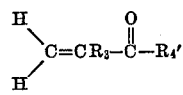

wherein $R_3$ is a group selected from the class consisting of hydrogen, alkyl, cycloalkyl, aryl, aralkyl, alkaryl and furyl groups and $R_4'$ is a group selected from the class consisting of alkyl, cycloalkyl, and aralkyl groups, the amount of said dialkylzinc being from 0.01 to 10 mole percent based on said monomer system, the mole ratio of said ketone to said dialkylzinc being from 0.1 to 10 mole per one mole, in the presence of an inert solvent, at a temperature within the range from about 0° C., to 200° C., under an inert atmosphere to yield a solid polymer of high molecular weight, which contains said $\alpha,\beta$-unsaturated ketone units.

3. A process for the production of epoxide polymers, which comprises polymerizing a monomer system selected from the group consisting of (a) olefin oxides having 2–8 carbon atoms, and mixtures thereof, and (b) mixtures of a monomer selected from the group consisting of said olefin oxides and another monomer selected from the group consisting of glycidyl ethers having ethylenically unsaturated bond and glycidyl ethers having furan group by using dialkylzinc having the general formula R—Zn—R wherein R represents a lower alkyl as catalyst in the presence of $\alpha,\beta$-unsaturated ketone having the general formula

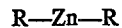
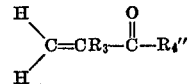

wherein $R_3$ is selected from the class consisting of hydrogen, alkyl, cycloalkyl, aryl, aralkyl, alkaryl and furyl groups and $R_4''$ is selected from the class consisting of aryl, alkaryl and furyl groups, the amount of said dialkylzinc being from 0.01 to 10 mole percent based on said monomer system, the mole ratio of said ketone to said dialkylzinc being from 0.1 to 10 mole per one mole in the presence of inert solvent at a temperature within the range from about 0° C. to 200° C. under an inert atmosphere to yield a solid polymer of high molecular weight which contains said $\alpha,\beta$-unsaturated ketone units.

4. A process for the production of epoxide polymers, which comprises polymerizing a monomer system selected from the group consisting of (a) olefin oxides having 2–8 carbon atoms, and mixtures thereof, and (b) mixtures of a monomer selected from the group consisting of said olefin oxides and another monomer selected from the group consisting of glycidyl ethers having ethylenically unsaturated bond and glycidyl ethers having furan group by using dialkylzinc having the general formula $$R-Zn-R$$

wherein R represents a lower alkyl as catalyst in the presence of $\alpha,\beta$-unsaturated ketone having the general formula

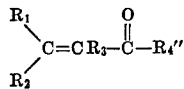

wherein $R_1$, $R_2$ and $R_3$ are groups selected from the class consisting of hydrogen, alkyl, cycloalkyl, aryl, aralkyl, alkaryl and furyl groups, provided that both $R_1$ and $R_2$ should not be hydrogen and $R_4''$ is a group selected from the class consisting of aryl, alkaryl and furyl groups, the amount of said dialkylzinc being generally from 0.01 to 10 mole percent based on said monomer system, the mole ratio of said ketone to said dialkylzinc being from 0.1 to 10 mole per one mole, in the presence of inert solvent, at a temperature within the range from about 0° C. to 200° C. under an inert atmosphere to yield a solid polymer of high molecular weight which contains said $\alpha,\beta$-unsaturated ketone units.

5. A process for the production of epoxide polymers, which comprises polymerizing a monomer system selected from the group consisting of (a) olefin oxides having 2–8 carbon atoms, and mixtures thereof, and (b) mixtures of a monomer selected from the group consisting of said olefin oxides and another monomer selected from the group consisting of glycidyl ethers having ethylenically unsaturated bond and glycidyl ethers having furan group by using dialkylzinc having the general formula $$R-Zn-R$$

wherein R represents a lower alkyl as catalyst in the presence of $\alpha,\beta$-unsaturated ketone having the general formula

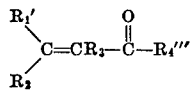

wherein $R_1'$ is a group selected from the class consisting of aryl, furyl and alkaryl group, $R_2$ and $R_3$ are groups selected from the class consisting of hydrogen, alkyl, cycloalkyl, aryl, aralkyl, alkaryl and furyl groups and $R_4'''$ is alkyl, the amount of said dialkylzinc being from 0.01 to 10 mole percent based on said monomer system, the mole ratio of said ketone to said dialkylzinc being from 0.1 to 10 mole per one mole, in the presence of inert solvent, at a temperature within the range from about 0° C. to 200° C. under an inert atmosphere to yield a solid polymer of high molecular weight which contains said $\alpha,\beta$-unsaturated ketone units.

6. A process according to claim 1, wherein said inert solvent is a compound selected from the group consisting of hydrocarbons and ethers.

7. A process according to claim 1, wherein said $\alpha,\beta$-unsaturated ketone is a compound selected from the group consisting of methyl vinyl ketone, phenyl vinyl ketone, benzalacetone and furfurylidene acetone.

8. A process according to claim 1, wherein said olefin oxide is a compound selected from the group consisting of propylene oxide and ethylene oxide.

9. A process according to claim 1, wherein said mixture of the olefin oxides is propylene oxide-butadiene monoxide.

10. A process according to claim 1, wherein said mixture of the olefin oxide and the glycidyl ether is propylene oxide-allyl glycidyl ether.

11. A process according to claim 1, wherein said mixture of the olefin oxide and the glycidyl ether is propylene oxide-furfuryl glycidyl ether.

References Cited

UNITED STATES PATENTS

| | | | |
|---|---|---|---|
| 2,570,601 | 10/1961 | Schmerling | 260—88.3 |
| 2,599,817 | 6/1952 | Evans et al. | 260—88.3 |
| 2,676,166 | 4/1954 | Webers | 260—66 |
| 3,024,219 | 3/1962 | France et al. | 260—88.3 |
| 3,031,439 | 4/1962 | Bailey | 260—88.3 |
| 3,068,212 | 12/1962 | Jenkins | 260—66 |
| 3,201,373 | 8/1965 | Kaizerman | 260—66 |
| 3,127,371 | 3/1964 | Gartz et al. | 260—2 |
| 3,234,251 | 2/1966 | Gartz et al. | 260—429.9 |

HARRY WONG, Jr., Primary Examiner

U.S. Cl. X.R.

260—2, 88.3, 88.5, 91.1